United States Patent Office 2,984,676
Patented May 16, 1961

2,984,676
3-OXYGENATED 6β-HALO-5-METHYL-19-NOR-5β-PREGN-9-EN-20-ONES

Joseph S. Mihina, Skokie, Ill., assignor to G. D. Searle & Co., Chicago, Ill., a corporation of Delaware No Drawing. Filed June 12, 1959, Ser. No. 819,816

7 Claims. (Cl. 260—397.3)

This invention relates to 3-oxygenated 6-halo-5-methyl-19-nor-5β-pregn-9-en-20-ones and processes for the manufacture thereof. More particularly, this invention relates to compounds of the formula

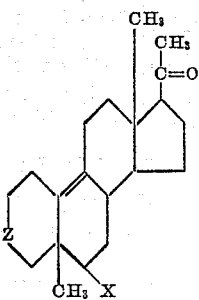

wherein X represents halogen and Z represents a hydroxymethylene (—CHOH—), alkanoyloxymethylene (—CHOCOR—)

or carbonyl (—CO—) radical, R in the parenthetical formula standing for an alkyl radical. Among the halogens represented by X, especially those having an atomic number less than 53—which is to say fluorine, chlorine, and bromine—are preferred. The hydroxymethylene and alkanoyloxymethylene radicals comprehended by Z are desirably in the beta configuration, and the latter groupings are best adapted to purposes of this invention when the alkyl constituent (R) is of lower order. Lower alkyl radicals include methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ aggregates wherein $n$ is a positive integer amounting to less than 9. Alkanoyloxymethylene radicals of the preferred type are hereinafter referred to as lower alkanoyloxymethylene radicals. Those skilled in the art will recognize that when Z in the generic formula designates such groupings, the compounds contemplated are esters of the alcohols depicted when Z represents a hydroxymethylene radical.

The compounds of this invention are useful by reason of their valuable pharmacological properties. For example, they block the effect of desoxycortiscosterone acetate on urinary sodium and potassium and are, thus, diuretic agents.

Manufacture of the subject compositions proceeds from corresponding halodiol esters of the formula

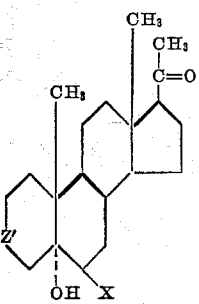

Z′ being representative of an alkanoyloxymethylene radical and X being defined as before. On heating such an ester under appropriately esterifying and dehydrating conditions—for example, with an alkanoic acid anhydride in the presence of potassium acid sulfate or sulfuric acid, and with a corresponding alkanoic acid added to increase solubility, if desired—one obtains the claimed esters hereof. These, in turn, are subject to mild saponification—for example, by heating with alkali carbonate in aqueous methanol—to give the 3-ols of this invention; and the latter compounds are oxidized to the subject 3-ones by heating with chromium trioxide in a heterogeneous medium comprising, aqueous acetic acid and an inert solvent for the steroid present.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

3β-acetoxy-6β-fluoro-5-methyl-19-nor-5β-pregn-9-en-20-one

A mixture of 16 parts of 3β-acetoxy-6β-fluoro-5-hydroxy-5α-pregnan-20-one [preparable by the procedure of Bowers and Ringold, Tetrahedron, 3, 14 (1958)] and approximately 5 parts of powdered potassium bisulfate in 200 parts of acetic anhydride is heated with agitation at 70° for 30 minutes, whereupon it is dumped into 800 parts of aqueous 15% sodium chloride and let stand therein for 2 hours. The resultant mixture is extracted with isopropyl acetate; and the acetate extract is consecutively washed with aqueous 10% sodium bicarbonate and water, then dried over anhydrous sodium sulfate and stripped of solvent by vacuum distillation. The residue is the desired 3β-acetoxy-6β-fluoro-5-methyl-19-nor-5β-pregn-9-en-20-one, of the formula

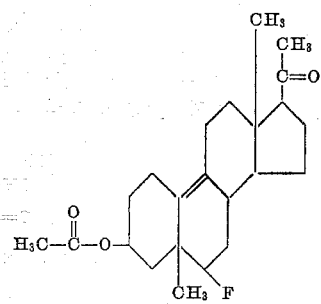

EXAMPLE 2

3β-acetoxy-6β-chloro-5-methyl-19--nor-5β-pregn-9-en-20-one

A mixture of approximately 96 parts of 3β-acetoxy-6β-chloro-5-hydroxy-5α-pregnan-20-one [preparable from the corresponding 5α,6α-epoxide of Bowers and Ringold, Tetrahedron, 3, 14 (1958), by treatment with dry hydrogen chloride in chloroform according to the technique of Barton and Miller, J. Amer. Chem. Soc., 72, 370 (1950)] and 27 parts of powdered potassium bisulfate in 900 parts of acetic anhydride and 460 parts of acetic acid is heated with agitation at 70° for 30 minutes, then cooled to 35° and dumped into 4000 parts of aqueous 10% sodium chloride. The resultant mixture is let stand for 3 hours and then extracted with isopropyl acetate. The acetate extract is consecutively washed with aqueous 10% sodium bicarbonate and water, then concentrated to approximately ½ the volume of the acetic acid used above as a solvent and diluted with an equal volume of hot ethanol. Upon chilling, the resultant solution precipitates the desired 3β-acetoxy-6β-chloro-5-methyl-19-nor-5β-pregn-9-en-20-one, which melts at approximately 114–115°. A 1% solution of the product in chloroform is characterized by a specific rotation of +219°. The product has the formula

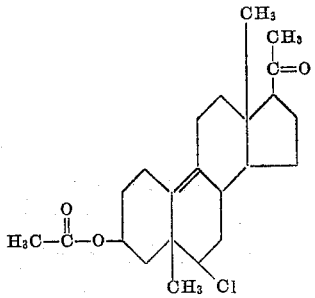

EXAMPLE 3

A. *3β-acetoxy-6β-bromo-5-hydroxy-5α-pregnan-20-one*

To a solution of 8 parts of 3β-acetoxy-5,6α-epoxy-5α-pregnan-20-one in 670 parts of dichloromethane is added 640 parts of 48% hydrobromic acid. The resultant mixture is stirred vigorously for 15 minutes at room temperatures, whereupon the organic layer is separated and consecutively washed with aqueous 10% sodium bicarbonate and water. When the wash water is neutral, the purified solution is dried over anhydrous sodium sulfate and stripped of solvent by vacuum distillation. The residue is the desired 3β-acetoxy-6β-bromo-5-hydroxy-5α-pregnan-20-one, which can be further purified by recrystallization from 95% ethanol.

B. *3β-acetoxy-6β-bromo-5-methyl-19-nor-5β-pregn-9-en-20-one*

A mixture of 10 parts of 3β-acetoxy-6β-bromo-5-hydroxy-5α-pregnan-20-one and approximately 3 parts of powdered potassium bisulfate in 125 parts of acetic anhydride is heated at 70–80° for 20 minutes with agitation. It is thereupon dumped into 500 parts of aqueous 10% sodium chloride and allowed to stand for 2 hours. The resultant mixture is extracted with isopropyl acetate; and the acetate extract is consecutively washed with aqueous 10% sodium bicarbonate and water, dried over anhydrous sodium sulfate, and stripped of solvent by vacuum distillation. The residue is the desired 3β-acetoxy-6β-bromo-5-methyl-19-nor-5β-pregn-9-en-20-one, of the formula

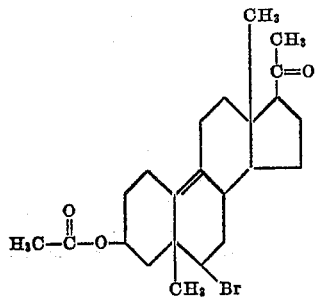

EXAMPLE 4

*6β-chloro-3β-hydroxy-5-methyl-19-nor-5β-pregn-9-en-20-one*

To a solution of approximately 12 parts of 3β-acetoxy-6β-chloro-5-methyl-19-nor-5β-pregn-9-en-20-one in 560 parts of methanol is added 28 parts of potassium carbonate dissolved in 250 parts of water. The resultant mixture is stirred at room temperatures for 20 hours. The precipitate which forms is filtered off, washed on the filter with 70% methanol in water, and dried in air. This material is 6β-chloro-3β-hydroxy-5-methyl-19-nor-5β-pregn-9-en-20-one, which melts at 165–168° and has a specific rotation as measured in chloroform solution (1%) of +232.5°. The product has the formula

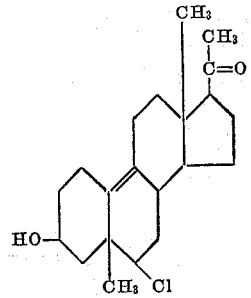

By the foregoing precedure, 3β-acetoxy-6β-fluoro-5-methyl-19-nor-5β-pregn-9-en-20-one and 3β-acetoxy-6β-bromo-5-methyl-19-nor-5β-pregn-9-en-20-one likewise are converted to the corresponding alcohols, 6β-fluoro-3β-hydroxy-5-methyl-19-nor-5β-pregn-9-en-20-one and 6β-bromo-3β-hydroxy-5-methyl-19-nor-5β-pregn-9-en-20-one, respectively.

EXAMPLE 5

*6β-chloro-5-methyl-19-nor-5β-pregn-9-ene-3,20-dione*

To a solution of 8 parts of 6β-chloro-3β-hydroxy-5-methyl-19-nor-5β-pregn-9-en-20-one in 135 parts of benzene is cautiously added approximately 4 parts of chromium trioxide dissolved in 48 parts of acetic acid and 24 parts of water. The resultant mixture is stirred vigorously at room temperatures for 5 hours, whereupon a solution of 1 part of sodium sulfite in 50 parts water is introduced. After thorough mixing, the aqueous phase is separated and extracted with isopropyl acetate. The benzene phase is combined with the acetate extract and the resultant solution consecutively washed with aqueous 10% sodium bicarbonate and water. The solution is then concentrated to approximately one-tenth its original volume by vacuum distillation, precipitating the desired 6β-chloro-5-methyl-19-nor-5β-pregn-9-ene-3,20-dione, which melts at 164-166°. A 1% solution of the product in chloroform is characterized by a specific rotation of +179.0°. The product has the formula

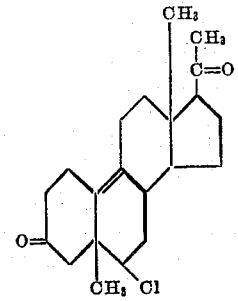

What is claimed is:
1. A compound of the formula

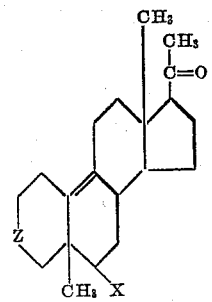

wherein X is halogen of atomic number less than 53 and Z is selected from the group consisting of β-hydroxymethylene, β-(lower alkanoyloxy)methylene, and carbonyl radicals.

2. A compound of the formula

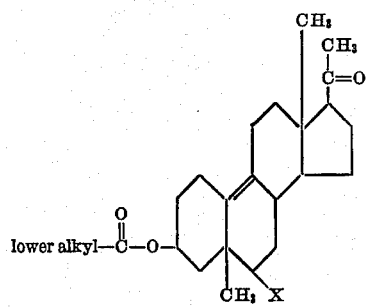

wherein X is halogen of atomic number less than 53.

3. 3β-acetoxy-6β-fluoro-5-methyl-19-nor - 5β - pregn-9-en-20-one.

4. 3β-acetoxy-6β-chloro-5-methyl-19 - nor - 5β - pregn-9-en-20-one.

5. 3β-acetoxy-6β-bromo - 5 - methyl - 19-nor-5β-pregn-9-en-20-one.

6. 6β-chloro-3β - hydroxy - 5-methyl-19-nor-5β-pregn-9-en-20-one.

7. 6β-chloro - 5 - methyl - 19-nor-5β-pregn-9-ene-3,20-dione.

No references cited.